US011472563B2

United States Patent
Calmels et al.

(10) Patent No.: US 11,472,563 B2
(45) Date of Patent: Oct. 18, 2022

(54) METHOD FOR DETECTING FREEZING CONDITIONS FOR AN AIRCRAFT BY SUPERVISED AUTOMATIC LEARNING

(71) Applicant: Airbus Operations (S.A.S.), Toulouse (FR)

(72) Inventors: Alice Calmels, Blagnac (FR); Jean Pasquie, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 846 days.

(21) Appl. No.: 16/255,106

(22) Filed: Jan. 23, 2019

(65) Prior Publication Data
US 2019/0225346 A1  Jul. 25, 2019

(30) Foreign Application Priority Data

Jan. 24, 2018 (FR) ...................... 1850553

(51) Int. Cl.
*B64D 15/20* (2006.01)
*G06N 20/00* (2019.01)
(Continued)

(52) U.S. Cl.
CPC ............. *B64D 15/20* (2013.01); *G06N 5/003* (2013.01); *G06N 20/00* (2019.01); *G06N 20/20* (2019.01); *G06Q 10/04* (2013.01); *G06Q 50/30* (2013.01)

(58) Field of Classification Search
CPC ........ B64D 15/20; B64D 15/22; B64D 15/00; B64D 2033/0233; B64D 45/00; B64D 31/06; B64D 33/02; B64D 15/166; B64D 15/16; B64D 15/163; B64D 2033/0286; B64D 2045/0085; B64D 43/00;
(Continued)

(56) References Cited

U.S. PATENT DOCUMENTS 9,666,051 B2    5/2017  Rossotto et al.
9,805,608 B2 * 10/2017  Gillet ................... G08G 5/0091
2015/0339930 A1 * 11/2015 Mccann ................ G08G 5/006
                                                      701/528

FOREIGN PATENT DOCUMENTS

EP    2 979 980 A1    2/2016
EP    3 269 944 A1    1/2018
(Continued)

OTHER PUBLICATIONS

French Search Report for Application No. 1850553 dated Sep. 11, 2018.

*Primary Examiner* — Jelani A Smith
*Assistant Examiner* — Paul A Castro
(74) *Attorney, Agent, or Firm* — Jenkins, Wilson, Taylor & Hunt, PA

(57) ABSTRACT

A method for detecting icing conditions for an aircraft including a measurement of the parameters of embedded systems, with the exception of probes dedicated to the detection of ice, a transformation of the measurements of the symptomatic parameters to obtain P-tuples of values of explanatory variables which explain icing conditions, a classification of the measurements by classifiers on the basis of the P-tuples of values thus obtained, the classifiers having been previously trained in a supervised manner, each classifier providing a prediction of membership in a class of icing conditions, the predictions of the various classifiers being consolidated to provide a consolidated prediction of icing conditions.

10 Claims, 4 Drawing Sheets

(51) Int. Cl.
  *G06N 5/00* (2006.01)
  *G06N 20/20* (2019.01)
  *G06Q 50/30* (2012.01)
  *G06Q 10/04* (2012.01)

(58) Field of Classification Search
  CPC ........ B64D 15/12; G01K 13/028; G01K 1/20;
  G01K 13/024; G01K 1/024; G01K 3/04;
  G08B 19/02; F02C 7/047; G01P 5/00;
  G01P 5/26; G01S 13/953; G01S 17/95;
  G01S 17/58; G01S 17/87; G01S
  2007/4977; G01N 1/2273; G01N
  2001/2285; G01N 2291/0251; G01N
  25/56; G01N 21/53; G01N 2291/0425;
  G01N 25/18; G01N 25/68; G01N 29/022;
  G01N 25/58; G01N 33/0036; F01D
  25/02; F01D 17/085; G05D 1/0808;
  G01W 1/08
  See application file for complete search history.

(56) References Cited

FOREIGN PATENT DOCUMENTS

EP      3 517 442 B1   4/2020
WO     WO-2014106268 A1 *  7/2014   ........... G08G 5/0039

\* cited by examiner

METHOD FOR DETECTING FREEZING CONDITIONS FOR AN AIRCRAFT BY SUPERVISED AUTOMATIC LEARNING

CROSS-REFERENCE TO RELATED APPLICATION

This application claims priority to French patent application 18 50553 filed on Jan. 24, 2018, the entire disclosure of which is incorporated by reference herein.

TECHNICAL FIELD

The disclosure herein relates generally to forecasting of meteorological conditions for an aircraft. It also relates to the field of supervised learning (supervised machine learning).

BACKGROUND

The occurrence of freezing conditions in flight constitutes a risk for aircraft. Indeed, when an aircraft encounters such conditions, it is exposed to an accumulation of ice on its surfaces which can lead to an appreciable increase in the weight of the aircraft, a loss of lift, problems actuating the control surfaces, defects in communication and operation of the antennas, measurement errors of the anemometric probes, losses of engine thrust, these various malfunctions possibly ultimately leading to a loss of control of the airplane.

To alleviate these malfunctions, aircraft entitled to fly in freezing conditions are equipped with ad hoc protection systems, notably heating systems, integrated into the elements to be protected (airfoil, probes, engine air inlets, etc.) preventing the formation or the accumulation of ice.

The activation of these protection systems generally relies on the judgment of the pilot after the latter has visually identified the presence of freezing conditions. This identification necessarily being imperfect, recourse is generally had to mechanical or optical detection systems to aid the pilot in their judgment. Thus, it is commonplace to equip an aircraft with probes (or sensors) mounted on the skin of the airplane and to utilize the measurements obtained to diagnose the presence of ice. However, these detection systems do not generally trigger the activation of the protection systems automatically. An assessment of the measurements by the pilot is still necessary taking into account the flight phase, the criticality of the functions fulfilled by the elements affected by the ice and associated safety margins, so as to avoid any untimely triggering of the protection systems.

Current systems for detecting freezing conditions exhibit several drawbacks.

Firstly, these systems are installed on the skin of the fuselage or a surface of the aircraft, which, on the one hand, makes it necessary to drill into the fuselage/the surface in question, to provide mechanical strengthening in proximity to the hole, to deploy electrical wiring and to install additional acquisition systems in electrical cabinets. Furthermore, the sensors/probes often protrude from the skin of the fuselage and consequently cause induced drag, thereby affecting the performance of the aircraft.

Next, current systems for detecting freezing conditions have relatively limited performance in the sense that they are only capable of responding to certain very limited conditions of ice formation. They are generally ineffective when dealing with detecting the formation of big drops of water or of crystals of large size.

An object of the disclosure herein is to propose a method for detecting freezing conditions for an aircraft, which at least partly remedies the drawbacks hereinabove, in particular which does not require any additional drilling and wiring operations, does not increases either the weight of the airplane or its aerodynamic drag, and makes it possible at one and the same time to appraise a wide range of freezing conditions and to provide a more precise diagnosis than in the prior art.

SUMMARY

The disclosure herein relates to a method for detecting icing conditions for an aircraft, comprising:
 measurement of parameters of systems of the aircraft with the exception of ice-detecting external probes, the systems being unsusceptible to degraded operation in the presence of ice and the parameters being symptomatic of the presence of ice on the aircraft;
 transformation of the measurements of these parameters into P-tuples of values of explanatory variables which explain the icing conditions;
 classification of the measurements by at least one classifier previously trained in a supervised manner, the classifier providing a prediction of membership in a class of icing conditions.

The parameters of systems of the aircraft are advantageously chosen from among the lists of parameters from ATA21, ATA27, ATA28, ATA30, ATA32, ATA34, ATA36, ATA70 to ATA79.

The parameters can be selected from among temperatures, currents of heating circuits, pressures, disparities between actuator commands and feedbacks, kinematic, altimetric, barometric and anemometric parameters.

The transformation of the measurements of parameters into values of explanatory variables comprises for example the calculation of a mean, of a median, of a standard deviation, of a variance, a Fourier transform, a low-pass or high-pass filtering, a wavelet decomposition, a spectral density calculation.

The classification step is advantageously performed by a plurality of classifiers, the respective predictions of these classifiers being consolidated, the result of the consolidation giving a prediction of the presence/absence of ice or otherwise, or else a degree of severity of the icing conditions.

The classifiers preferably use classification models chosen from among a decision-tree classification model, a classification model based on linear discriminant analysis, a classification model based on quadratic discriminant analysis, a classification model based on a forest of decision trees, a classification model using a bagging of decision trees, a classification model using a logistic regression, a classification model using the method of k nearest neighbors, a classification model using a boosting of weak classifiers.

The measurements of parameters can notably be transmitted by the craft to a ground station, the ground station performing the transformation and classification steps and then returning the result of the consolidation to the aircraft.

The disclosure herein also relates to a method of supervised training of the above-defined method for predicting icing conditions, the method of supervised training comprising:

measurement of the parameters of systems of the aircraft during a flight under freezing conditions;

transformation of the measurements of these parameters into P-tuples of values of explanatory variables which explain the icing conditions;

detection of presence of freezing conditions during the flight by dedicated probes situated on the aircraft;

allocation of classes of freezing conditions to the measurements on the basis of the conditions detected in the previous step;

training of a plurality of classifiers on the basis of the explanatory variables and of the corresponding classes allocated;

comparison of the prediction performance of the classifiers by cross-validation over the set of measurements;

selection of at least one classifier from among the best performing classifiers to predict the icing conditions.

Preferably, the detection of presence of freezing conditions during the flight also uses meteorological sources external to the aircraft.

The prediction performance of a classifier is for example estimated on the basis of the mean absolute value of the prediction error or of the mean square value of the prediction error or of the mean success rate of prediction over the set of measurements.

The classification models are advantageously chosen from among a decision-tree classification model, a classification model based on linear discriminant analysis, a classification model based on quadratic discriminant analysis, a classification model based on a forest of decision trees, a classification model using a bagging of decision trees, a classification model using a logistic regression, a classification model using the method of k nearest neighbors, a classification model using a boosting of weak classifiers.

BRIEF DESCRIPTION OF THE DRAWINGS

Other characteristics and advantages of the disclosure herein will become apparent on reading a preferential embodiment of the disclosure herein, done with reference to the attached figures among which.

DETAILED DESCRIPTION

An idea underlying the disclosure herein is to use the available aircraft data, without developing and installing specific external probes/sensors and therefore without implanting probes/sensors on the skin of the aircraft, to detect the presence of freezing conditions and estimate, if relevant, their degree of severity. By specific sensors is meant here sensors whose measurements are exclusively intended for detecting presence of ice (for example a detector of ice crystals). By available aircraft data is meant data of aircraft systems whose operation is not degraded by the formation of ice, stated otherwise the data which are reliable in such a situation (for example the data arising from an anemometric probe, at risk of being blocked by ice, are not considered to be available data).

When an aircraft encounters freezing conditions, certain elements of systems, such as sensors or control surface actuators, have a characteristic response, symptomatic of the presence of ice. These symptoms can vary in number, in intensity, in frequency according to the type of freezing conditions encountered (crystals of ice or supercooled water for example) and their degree of severity (concentration of ice crystals). As a consequence, it is possible to select certain parameters which are symptomatic (of freezing conditions) from among the available data of the aircraft's systems and to deduce therefrom explanatory parameters (also termed explanatory variables or "features") which explain the presence of freezing conditions and if relevant their severity. These explanatory variables are used as input to one or a plurality of classifiers so as to determine whether or not ice is present (binary classification) or to appraise the degree of severity of the freezing conditions (classification with K modalities where K is the number of classes). The classification models are trained by supervised learning on the basis of available data acquired by specific instrumentation during flights carried out under freezing conditions, as explained further on.

Figure 1:
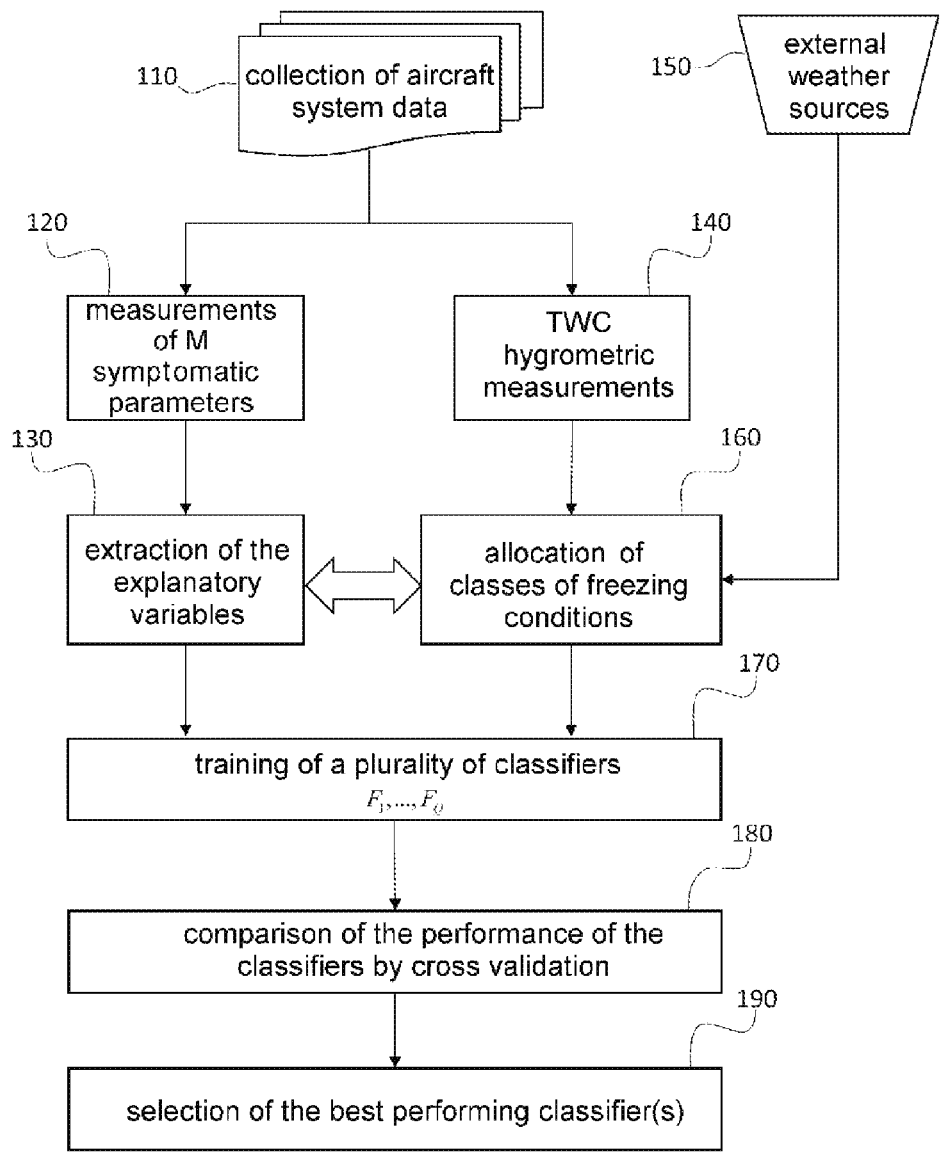
FIG. 1 represents in a schematic manner a method of supervised learning to train a method for detecting freezing conditions according to one embodiment of the disclosure herein.

FIG. 1 represents in a schematic manner a method of supervised learning for a system for detecting freezing conditions according to one embodiment of the disclosure herein.

Prior to the supervised learning, the available data obtained during trial flights of an aircraft under freezing conditions are collected at 110. These data are measurements of parameters of systems of the aircraft which are unsusceptible to operate in degraded mode in the presence of ice. Furthermore, during these flights, the trial aircraft is equipped with sensors dedicated to the direct detection of ice, termed test sensors.

Consequently one has, on the one hand, measurements of aircraft parameters and, on the other hand, a diagnosis as regards the presence or the absence of ice, optionally supplemented with a measurement of the water content (crystals and supercooled water).

Next, from among the measured parameters, a plurality M of parameters which are symptomatic of the presence of ice is selected at 120. These symptomatic parameters will advantageously be chosen from among those listed in chapters ATA 21 (air conditioning and pressurization), ATA 27 (flight controls), ATA 28 (fuel), ATA 30 (ice and rain protection), ATA 32 (landing gear), ATA 34 (navigation), ATA 36 (pneumatics), ATA 70 to ATA 79 (engines, engine controls and indications, FADEC (Full Authority Digital Engine Control) channels). The symptomatic parameters selected are typically temperatures, currents of heating circuits, pressures, disparities between actuator commands and feedbacks, kinematic (accelerations, rotation rate, speed), altimetric (altitude), barometric (barometric pressure) and anemometric (apparent wind speed) parameters.

By way of example, it is possible to choose in chapter ATA 21 the parameters related to the temperatures at various points of the cabin, to the temperatures of the ducts of the pressurization systems and to the deicing controls, in chapter ATA 27 the parameters related to the accelerations, to the clinometry, to the control of the surfaces (elevator and/or ailerons and/or spoiler), in chapter ATA 28 the parameters related to the fuel temperatures in each compartment, in chapter ATA 30 the parameters related to energy consumption and to the electrical power supply of the components for deicing and protection against the wind, in chapter ATA 32 the parameters related to the temperatures of the landing gear, in ATA 34 the parameters related to the attitude of the craft (pitch, roll, yaw), to the dynamic measurements (acceleration, rotation rate), to the anemobarometric measurements, in chapter ATA 36 the parameters related to the cooling system, and in chapter ATA 7X the parameters related to the vibrations and/or to the engine regulation and control information.

According to the disclosure herein, the symptomatic parameters are not limited to the ATA chapters listed hereinabove and may arise from other chapters such as chapter ATA 42 (Integrated Modular Avionics).

The measurements of symptomatic parameters acquired at a given instant form a sample. The set of samples acquired during a measurement campaign is denoted S.

The symptomatic parameters measured are thereafter transformed into explanatory variables which explain the freezing conditions (operation dubbed "features extraction") at 130. The transformation making it possible to pass from the symptomatic parameters to the explanatory variables can notably comprise a calculation of a mean, of a median, of a standard deviation, of a variance, a Fourier transform, a low-pass or high-pass filtering, a wavelet decomposition, a spectral density calculation, etc. The object of this operation is to delete or to reduce the non-explanatory information in the measurements and to prevent over-learning (overfitting) on the symptomatic parameters measured during the trials. Hereinafter the explanatory variables are denoted $X^1, \ldots, X^P$. With each sample of S is thus associated a P-tuple of values of explanatory variables. The freezing conditions, for their part, can be simply represented by a variable to be explained (or target variable) Y. This target variable is binary, when dealing with simply predicting the presence or the absence of ice, or has K modalities, when dealing with predicting the degree of severity of the freezing conditions (K then being the number of degrees of severity).

The measurements of the test sensors are acquired in parallel at 140. These test sensors are for example Lyman-alpha hygrometric sensors capable of giving the total water content or TWC, independently of the nature of its phase (liquid or vapor).

The measurements of the test sensors may be optionally supplemented at 150 with contextual meteorological information originating from exterior sources. On the basis of the measurements of the test sensors and, if relevant of this contextual meteorological information, the presence or otherwise of ice is determined at 160. Thus, a class (class labelling) can be allocated to each P-tuple of values of explanatory variables (and therefore to each sample of S) at 130. The classification may be simply binary (absence or presence of ice) or have K modalities, for example the following classification with 4 modalities:

absence of freezing condition (TWC≤0.5)
weak freezing condition (0.5<TWC≤1.5)
moderate freezing condition (1.5<TWC≤3)
severe freezing condition (TWC>3)

Other classes could be envisaged by the person skilled in the art without, however, departing from the framework of the disclosure herein. For example, a classification operating a distinction between the relative amount of crystals and the relative amount of supercooled water may be envisaged.

On the basis of the P-tuples of explanatory variables and of the classes which are allocated to them, several classification models, $F_1, \ldots, F_Q$ can be trained on the set S, as indicated at 170. A classification model is a function F associating with any P-tuple $(x^1, x^2, \ldots, x^P)$ of values of explanatory variables a prediction $\hat{y}$ of the value of the variable to be explained Y. More precisely, the training of a classifier consists in or comprises defining, in the space of explanatory variables, the domains associated with each of the possible modalities of the variable to be explained.

Various classification models can be envisaged, certain examples thereof being provided hereinafter:

Firstly, it will be possible to use a model of decision tree type such as CART (Classification And Regression Tree). A classification by decision tree is carried out by partitioning by dichotomy the space of explanatory variables according to a tree-like structure, a class being associated with each leaf of the decision tree. This classification model is trained on a part T of the set S (training data set) and tested on the remaining part V of this set (validation data set).

Alternatively, one and the same classification model (for example, a decision tree) can be trained on subsets $T_1, T_2, \ldots, T_N$ of S which are obtained by subsampling S in a random manner. The N classifiers resulting from this training can be aggregated with the aid of an aggregation function (for example majority vote). This technique is known in supervised learning by the name bagging (or bootstrap aggregating).

According to a variant, a classification model of the type with a forest of decision trees (Random Forest Classifier) can also be used. According to this approach, elementary decision-tree classifiers are trained on subsets of S, each classifier using only part of the variables to be explained. The elementary classifiers thus obtained are thereafter aggregated by a majority-vote decision, the predicted class being the one that garners the majority of the votes of the elementary classifiers.

Alternatively, a so-called boosting technique combining predictions of several weak classifiers can also be used. A classifier is termed weak if its prediction error rate is slightly better than that of a purely random prediction (random guessing). By combining the successive predictions of these weak classifiers, a classifier exhibiting a low error rate (high accuracy level) can be obtained. The weak classifiers may be for example decision-tree classifiers. There exist various types of boosting depending on whether the weak classifier is trained on the samples corresponding to the largest prediction errors of the preceding weak classifier (Adaboost) or on the square prediction errors of this classifier (Gradient Boosting).

The classification model can further be based on a linear discriminant analysis or LDA or indeed a quadratic discriminant analysis or QDA. Linear discriminant analysis assumes that the covariance matrix of the explanatory variables is identical for the various classes. The decision boundaries in the space of the variables are then hyperplanes. When the covariance matrices in the various classes are not identical, the decision function has a quadratic form (QDA): it is possible to get back to the previous case by considering a space of larger dimension representing not only the explanatory variables themselves but also quadratic variables (pairwise products and squares of the explanatory variables).

Alternatively again, the classification model will be able to use a classification according to the method of the k nearest neighbors or k-NN (k Nearest Neighbors). In this method, to predict the class associated with a given P-tuple $\Omega$ of values of explanatory variables, there is undertaken the search for the P-tuples, $\omega_1, \ldots, \omega_k$ which are nearest to $\Omega$, that were obtained during the learning. The class of the P-tuple is then predicted as being the predominant class (majority vote) from among the classes respectively associated with $\omega_1, \ldots, \omega_k$.

Finally, a classification model based on a logistic regression (multinomial logistic regression in the case of a variable to be explained with K modalities) may alternatively be used. According to this approach, the a posteriori probabilities of the various classes, knowing a P-tuple of values of explanatory variables, are modelled by linear functions. The coefficients of these functions can be determined as those maximizing the logarithmic likelihood over the training set, the search for the maximum being performed in an iterative manner on the values of the coefficients.

Of course, yet other types of classifiers may be envisaged such as for example state vector machines.

A description of the various classification models mentioned hereinabove may be found in the work by T. Hastie et al. entitled "The elements of statistical learning", $2^{nd}$ edition, 2017, published by Springer.

The performance of the $Q$ classifiers, $F_1, \ldots, F_Q$, corresponding to the various classification models can thereafter be compared using a cross validation, as indicated at 180. According to this approach, the set S of samples is partitioned into subsets (or batches) $S_\gamma$, $\gamma=1, \ldots, \Gamma$, each classifier $F_q$ being trained on a batch of samples $$\bigcup_{\substack{\gamma=1,\ldots,\Gamma \\ \gamma \neq \lambda}} S_\gamma$$

and its performance evaluated on the remaining subset $S_\lambda$, doing so for $\lambda \in \{1, \ldots, \Gamma\}$. The performance of a classifier can be evaluated in terms of mean of the absolute value or of the prediction error or of mean square error over each subset, the best performing classifier leading to the lowest mean error. Alternatively, the performance of a classifier can be evaluated as mean success rate of classification over each subset.

The best performing classifier or classifiers on termination of the supervised learning phase can thereafter be retained, as indicated at 190.

The classifiers thus selected will thereafter be used in the icing conditions prediction phase as explained further on.

Figure 2:
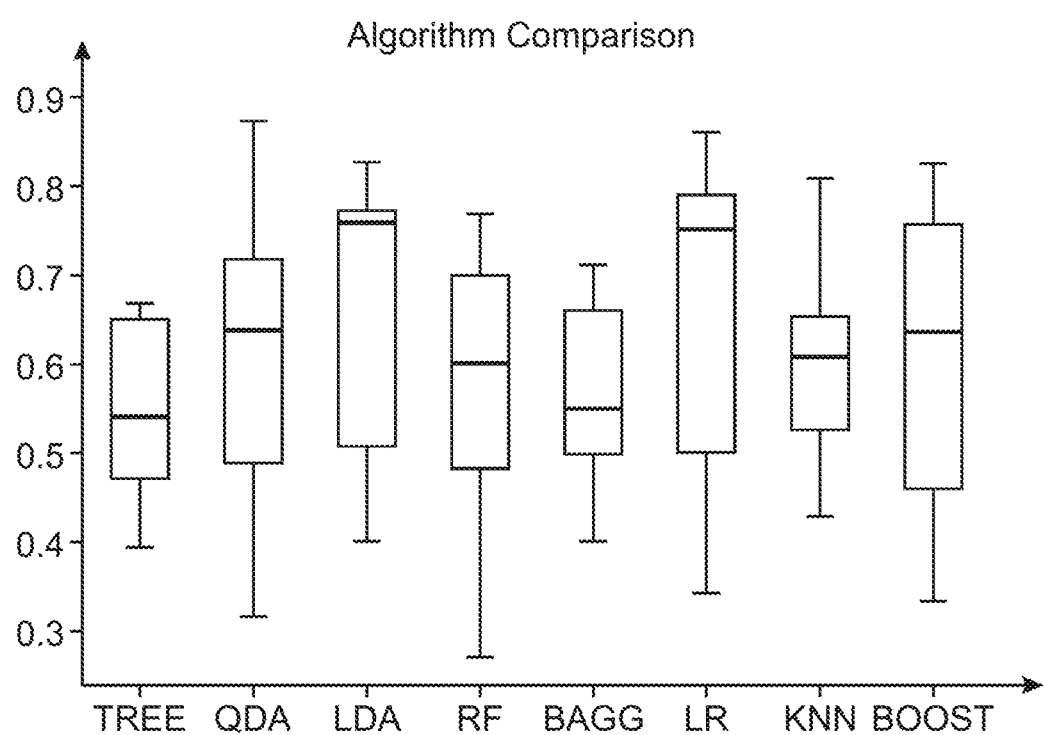
FIG. 2 illustrates the performance of a plurality of models of classification after supervised learning according to FIG. 1.

FIG. 2 represents the performance of a plurality of classification models on termination of a supervised learning according to FIG. 1.

The various types of classification models are indicated along the abscissa, namely:
  TREE is a decision-tree classification model;
  QDA is a classification model using a quadratic discriminant analysis;
  LDA is a classification model using a linear discriminant analysis;
  RF is a classification model using a forest of decision trees;
  BAGG is a classification model using a bagging of decision trees;
  LR is a classification model using a logistic regression;
  KNN is a classification model using the method of the k nearest neighbors;
  BOOST is a classification model using a boosting of weak classifiers.

In the figure, the success rate (accuracy) of each classifier has been indicated along the ordinate. More precisely, for each classifier, the distribution of the success rate has been represented by virtue of a box-and-whiskers plot (or simply boxplot). The distribution of the success rate relates to the various partitions, used in the cross validation, of the set of samples. The whiskers correspond to the minimum value and to the maximum value of the success rate, the lower and upper ends of a box correspond respectively to the lower quartile and to the upper quartile, the horizontal bar inside the box corresponds to the median value.

Advantageously, a classifier exhibiting a high success rate with a high median value is chosen, for example, the LR model and/or the BOOST model.

Figure 3:
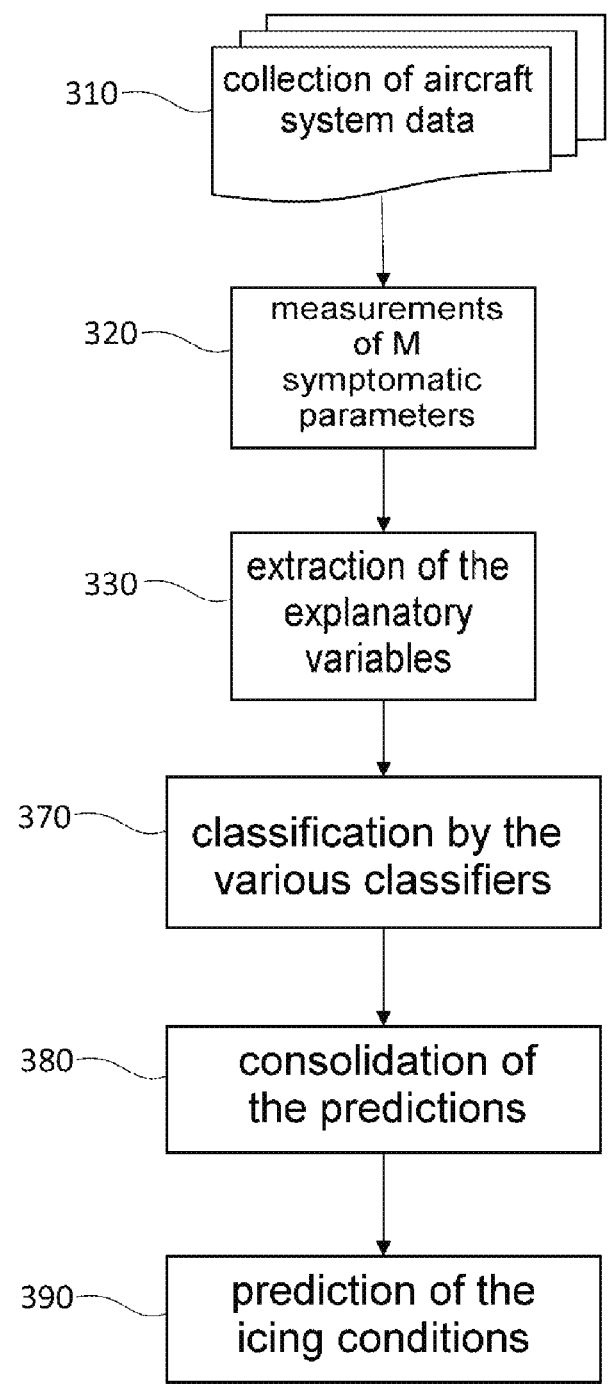
FIG. 3 represents in a schematic manner a method for detecting freezing conditions according to one embodiment of the disclosure herein, after supervised learning according to FIG. 1.

FIG. 3 represents in a schematic manner a method for detecting freezing conditions according to one embodiment of the disclosure herein, after supervised learning according to FIG. 1.

The method of detection is implemented in the course of an operational flight of an aircraft, generally of the same type as that used for the trial flights except that this time it does not comprise any test sensors (ice detector) capable of directly indicating the presence or the absence of ice.

In step 310, the available data of the systems of the aircraft are collected at regular intervals, these systems being unsusceptible to degraded operation in the presence of ice. Stated otherwise, a modification of behaviour or change of state of these systems in the presence of ice makes it possible to confirm the presence thereof, but without impairing flight safety.

In step 320, the measurements of the parameters which are symptomatic of the presence of ice are extracted and, if relevant, stored in a memory. These symptomatic parameters are in principle the same as those chosen for the learning method. Stated otherwise, these symptomatic parameters will have been chosen from among those listed in chapters ATA21, ATA27, ATA28, ATA30, ATA32, ATA34, ATA36, ATA70 to ATA79. However, if the classifiers retained on termination of the learning period do not use certain symptomatic parameters, the latter may be omitted in this acquisition phase.

In step 330, the measurements of the symptomatic parameters into values of explanatory variables are transformed, as explained previously in conjunction with step 130 of FIG. 1.

The transformation of the symptomatic parameters is carried out by a calculation module, such as a processor configured for this purpose.

In step 370, each classifier, trained on the data of the trial flights and selected in step 190 of the supervised learning predicts the class of icing conditions which is associated with the values of explanatory variables obtained in the previous step. The classification is of the same type as that trained during the learning phase. It can be binary or $\log_2$ K-ary depending on whether a prediction of presence/absence of ice or a prediction of the degree of severity of the icing conditions is desired.

In any event, when several classifiers have been selected, their respective predictions are consolidated in step 380, for example according to a majority vote procedure. When the number of selected classifiers is even, it may be agreed that one of them has a casting vote. According to a variant, regressors can be used instead of the classifiers so as to each estimate a (continuous) degree of severity, and perform a mean between them before optional discretization.

According to the result of the consolidation, it is determined at 390 whether or not ice is present (binary classification) or the degree of severity of the icing conditions (multinomial classification).

The classification, consolidation and prediction steps are performed by one or more calculation modules. These calculation modules can be hardware modules or software modules, for example software modules executed by the aforementioned processor. If relevant, the classifiers can be implemented in distinct processors operating in parallel, consolidation and prediction being performed by a programmable combinatorial logic circuit, such as an FPGA. The person skilled in the art will be able to envisage various modes of implementation of these steps without departing from the scope of the disclosure herein.

The method for predicting icing conditions can be executed entirely on board the aircraft, in an embedded item of equipment of FWC (Flight Warning Computer) or EFB (Electronic Flight Bag) type, after the classifiers have been trained on the ground (or in the trial airplane). Alternatively, the symptomatic parameters can be transmitted to the ground for remote monitoring of the ARTHM (Airbus Real Time Health Monitoring) type with the prediction result being returned to the aircraft. In all cases, the predicted or estimated icing condition may be displayed on a screen of the cockpit and optionally generate an alarm. The pilot will then have the possibility of activating the anti-ice protection systems. Alternatively, the icing condition may trigger anti-ice protection systems automatically.

By way of example, a method for detecting icing conditions is described hereinafter.

The symptomatic parameters have been chosen in ATA27, ATA34 and ATA7X namely the redundant flight control parameters FCPC (Flight Control Primary Computer) *_FCPC1_COM; *_FCPC2_COM; *_FCPC3_COM, the redundant kinematic parameters ADIRU (Air Data Inertial Reference Unit) ADIRU_*_1, ADIRU_*_2, ADIRU_*_3 and the regulation channels A-B FADEC of the two engines, namely POLOCAL_[1;2]A; POLOCAL_[1;2]B; T12LOCAL_[1;2]A; T12LOCAL_[1;2]B.

The explanatory variables are obtained by taking:
the median value of *_FCPC1_COM, *_FCPC2_COM, *_FCPC3_COM and then by calculating the min, max, mode and median value of the value obtained over a sliding window of 10 s,
the median value of ADIRU_*_1, ADIRU_*_2, ADIRU_*_3 and then by calculating the min, max, mode and median value of the value obtained over a sliding window of 10 s,
the maximum value of POLOCAL_[1;2]A and POLOCAL_[1;2]B, and then by calculating the min, max, mode and median value of the value obtained over a sliding window of 10 s,
the maximum value of T12LOCAL_[1;2]A; T12LOCAL_[1;2]B, and then by calculating the min, max, mode and median value of the value obtained over a sliding window of 10 s.

The classification had 4 degrees of severity of icing conditions as indicated above.

However, instead of using a single multinomial classifier, 4 binary classifiers were used for each of the intervals of TWC. The 4 classifiers are based on independent classification models of Gradient Boosting type. Table I indicates the performance of the classifiers in terms of success rate (accuracy) and precision (sensitivity):

TABLE I

|  | τ (%) | σ (%) |
|---|---|---|
| model #1 | 96.80 | 97.16 |
| model #2 | 96.07 | 97.96 |

TABLE I-continued

|  | τ (%) | σ (%) |
|---|---|---|
| model #3 | 97.32 | 82.08 |
| model #4 | 97.36 | 88.33 |

The success rate τ is defined as the ratio between the sum of the number of predictions which are actually positive (TP) and of the number of predictions which are actually negative (TN) over the set of positive and negative predictions (erroneous or not):

$$\tau = \frac{TP+TN}{TP+TN+FP+FN}$$

where FP (resp, EN) is the number of falsely positive (falsely negative) predictions.

The precision is the fraction of positive predictions that are actually positive:

$$\sigma = \frac{TP}{TP+FP}$$

It is consequently possible to correctly classify the freezing conditions on the basis of symptomatic parameters without adding any specific probe (ice sensor) and with a success rate of the order of 80%.

FIGS. 4A through 4D represent the results of classifying freezing conditions by classifiers based on the aforementioned four classification models.

Figure 4A:
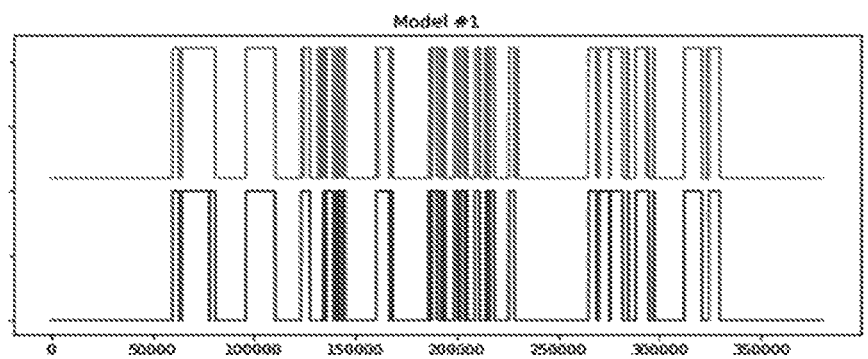
FIGS. 4A-4D represent in a schematic manner examples of detection of freezing conditions by various classifiers.
Figure 4B:
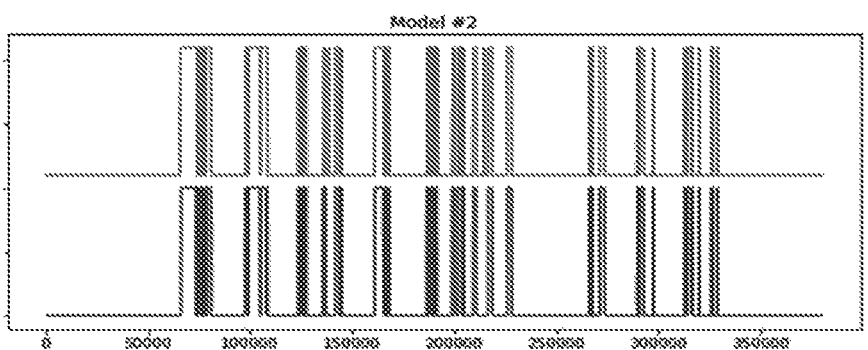
Figure 4C:
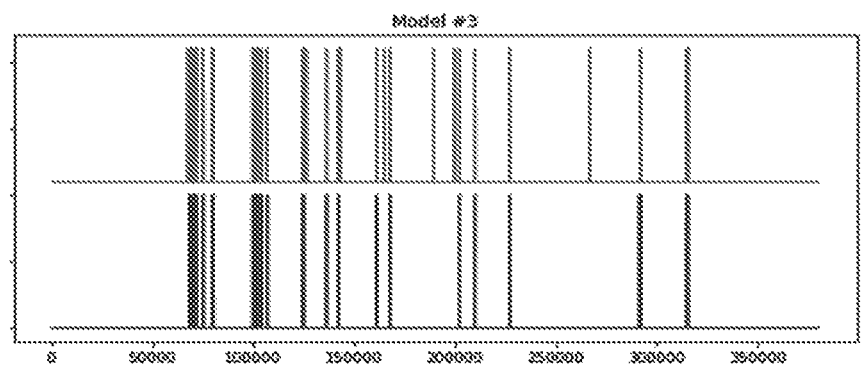
Figure 4D:
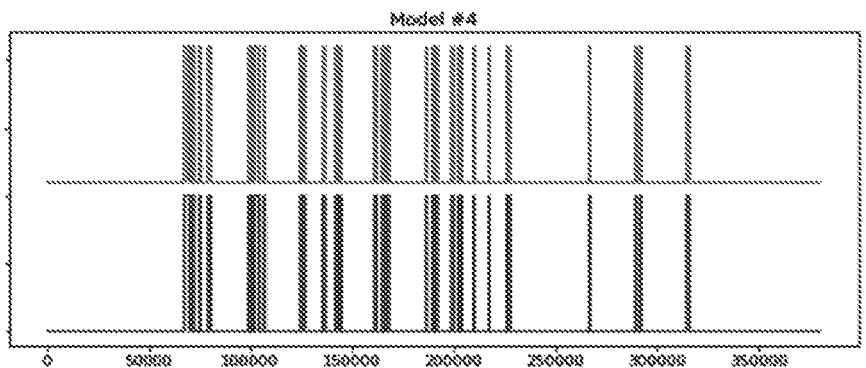

The first classification model in FIG. 4A predicts the condition (binary variable to be explained) TWC≤0.5, the second classification model in FIG. 4B predicts the condition 0.5<TWC≤1.5, the third classification model in FIG. 4C predicts the condition 1.5<TWC≤3 and finally the fourth classification model in FIG. 4D predicts the condition TWC>3. For each of these figures, the actual freezing condition has been represented in the upper part, and the freezing condition predicted by the corresponding classifier has been represented in the lower part. The person skilled in the art will note a very good correlation between the predicted conditions and the actual conditions whatever the degree of severity of the icing conditions.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for detecting icing conditions for an aircraft, the method comprising:
measuring parameters of systems of the aircraft with exception of ice-detecting external probes, the systems being unsusceptible to degraded operation in presence of ice and the parameters being symptomatic of the presence of ice on the aircraft;
transforming measurements of the measured parameters into P-tuples of values of explanatory variables which explain the icing conditions; and
classifying the measurements by at least one classifier previously trained in a supervised manner, the classifier providing a prediction of membership in a class of icing conditions;
wherein the parameters of the systems of the aircraft comprise parameters from one or more of ATA21, ATA27, ATA28, ATA30, ATA32, ATA34, ATA36, and ATA70 to ATA79.

2. The method for detecting icing conditions according to claim 1, wherein the parameters comprise one or more of temperatures, currents of heating circuits, pressures, disparities between actuator commands and feedbacks, and kinematic, altimetric, barometric, and anemometric parameters.

3. The method for detecting icing conditions according to claim 1, wherein the measurements of the measured parameters are transformed into values of explanatory variables by calculating a mean, a median, a standard deviation, a variance, a Fourier transform, a low-pass or high-pass filtering, a wavelet decomposition, or a spectral density calculation.

4. The method for detecting icing conditions according to claim 1, wherein the classifying is performed by a plurality of classifiers, respective predictions of the classifiers being consolidated, a result of the consolidation giving a prediction of presence or absence of ice or otherwise, or else a degree of severity of icing conditions.

5. The method for detecting icing conditions according to claim 4, wherein the classifiers use classification models selected from the group consisting of a decision-tree classification model, a classification model based on linear discriminant analysis, a classification model based on quadratic discriminant analysis, a classification model based on a forest of decision trees, a classification model using a bagging of decision trees, a classification model using a logistic regression, a classification model using the method of k nearest neighbors, and a classification model using a boosting of weak classifiers.

6. The method for detecting icing conditions according to claim 4, wherein the measurements of parameters are transmitted by the aircraft to a ground station, the ground station performing the transforming and classifying and then returning a result of the consolidation to the aircraft.

7. A method of supervised training of a method for predicting icing conditions according to claim 1, comprising:
measuring parameters of systems of the aircraft during a flight under freezing conditions;
transforming measurements of the measured parameters into P-tuples of values of explanatory variables which explain the icing conditions;
detecting presence of freezing conditions during the flight by dedicated probes situated on the aircraft;
allocating classes of freezing conditions to the measurements on a basis of the detected freezing conditions;
training a plurality of classifiers on a basis of the explanatory variables and of corresponding classes allocated;
comparing prediction performance of the classifiers by cross-validation over the measurements; and
selecting at least one classifier from among best performing classifiers to predict the icing conditions;
wherein the parameters of the systems of the aircraft comprise parameters from one or more of ATA21, ATA27, ATA28, ATA30, ATA32, ATA34, ATA36, and ATA70 to ATA79.

8. The method of supervised training according to claim 7, wherein detecting presence of freezing conditions during the flight also uses meteorological sources external to the aircraft.

9. The method of supervised training according to claim 7, wherein the prediction performance of a classifier is estimated on a basis of a mean absolute value of prediction error or of a mean square value of the prediction error or of a mean success rate of prediction over the measurements.

10. The method of supervised training according to claim 9, wherein the classifiers use classification models selected from the group consisting of a decision-tree classification model, a classification model based on linear discriminant analysis, a classification model based on quadratic discriminant analysis, a classification model based on a forest of decision trees, a classification model using a bagging of decision trees, a classification model using a logistic regression, a classification model using the method of k nearest neighbors, and a classification model using a boosting of weak classifiers.

* * * * *